(12) United States Patent
Wan et al.

(10) Patent No.: US 8,659,845 B2
(45) Date of Patent: Feb. 25, 2014

(54) HIGH-PRECISION MONOLITHIC OPTICAL ASSEMBLIES AND METHODS FOR FABRICATION AND ALIGNMENT THEREOF

(75) Inventors: Xiaoke Wan, Gainesville, FL (US); Jian Ge, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 634 days.

(21) Appl. No.: 12/933,490

(22) PCT Filed: Apr. 6, 2009

(86) PCT No.: PCT/US2009/039588
§ 371 (c)(1),
(2), (4) Date: Nov. 8, 2010

(87) PCT Pub. No.: WO2009/126546
PCT Pub. Date: Oct. 15, 2009

(65) Prior Publication Data
US 2011/0286100 A1    Nov. 24, 2011

Related U.S. Application Data

(60) Provisional application No. 61/043,056, filed on Apr. 7, 2008.

(51) Int. Cl.
*G02B 5/04*    (2006.01)
(52) U.S. Cl.
USPC .......................................... 359/831; 359/900
(58) Field of Classification Search
USPC ......... 359/522, 529, 555, 556, 578, 831, 850, 359/857, 862, 865, 900; 356/138, 150, 153
See application file for complete search history.

(56) References Cited

U.S. PATENT DOCUMENTS 3,836,258 A * 9/1974 Courten et al. ............... 356/138
3,884,548 A   5/1975 Linder
(Continued)

FOREIGN PATENT DOCUMENTS

EP    0003288    8/1979
GB    0772097    4/1957
(Continued)

OTHER PUBLICATIONS

Bartek et al., "Silver-based reflective coatings for micromachined optical filters," *Journal of Micromechanics and Microengineering*, 1999, 9: pp. 162-165.

(Continued)

*Primary Examiner* — Frank Font
(74) *Attorney, Agent, or Firm* — Miles & Stockbridge P.C.; David R. Schaffer; Frederick F. Rosenberger

(57) ABSTRACT

High-precision monolithic optical assemblies are formed using low-cost standard optical components, such as wedge plates and/or wedge second surface mirrors. By rolling and/or shifting the components relative to each other with matched optical surfaces in contact, a precise alignment solution is found for a particular optical assembly. The resulting arrangement of components can be bonded or held together so as to form a high-precision monolithic optical assembly, which can be inserted into an optical system, according to the assembly's function. The functionality of the monolithic optical assembly can be independent of the optical system in which it is used.

35 Claims, 6 Drawing Sheets

(56) References Cited

U.S. PATENT DOCUMENTS

| | | | |
|---|---|---|---|
| 4,190,366 A | 2/1980 | Doyle | |
| 4,278,351 A | 7/1981 | Frosch et al. | |
| 4,585,345 A | 4/1986 | Inoue | |
| 4,652,130 A | 3/1987 | Tank | |
| 4,890,917 A * | 1/1990 | Magee et al. | 356/138 |
| 4,907,879 A * | 3/1990 | Webb | 356/139.05 |
| 4,919,528 A * | 4/1990 | Pitalo et al. | 359/406 |
| 5,064,289 A | 11/1991 | Bockman | |
| 5,069,528 A * | 12/1991 | Dey | 359/233 |
| 5,313,269 A | 5/1994 | Ponce et al. | |
| 5,416,319 A | 5/1995 | Messina | |
| 5,457,531 A | 10/1995 | Rasanen | |
| 5,570,189 A * | 10/1996 | Salmon | 356/399 |
| 5,838,430 A * | 11/1998 | Slater et al. | 356/138 |
| 5,933,278 A * | 8/1999 | Plummer et al. | 359/627 |
| 5,949,543 A | 9/1999 | Bleier et al. | |
| 5,994,700 A | 11/1999 | Rajic et al. | |
| 6,034,763 A * | 3/2000 | Slater et al. | 356/138 |
| 6,141,101 A | 10/2000 | Bleier et al. | |
| 6,178,000 B1 | 1/2001 | Hoffnagle | |
| 6,538,747 B1 | 3/2003 | Arnold | |
| 6,624,956 B1 * | 9/2003 | Shechterman | 359/831 |
| 6,636,319 B1 | 10/2003 | Auth et al. | |
| 6,747,738 B2 * | 6/2004 | Knapp | 356/326 |
| 6,763,718 B1 | 7/2004 | Waters et al. | |
| 6,836,333 B1 | 12/2004 | Jones et al. | |
| 6,952,266 B2 | 10/2005 | Abbink | |
| 6,989,901 B2 | 1/2006 | Abbink | |
| 7,030,993 B2 | 4/2006 | Carlson | |
| 7,119,972 B2 * | 10/2006 | Prince | 359/837 |
| 7,142,357 B2 * | 11/2006 | Greenslade | 359/353 |
| 7,319,566 B2 * | 1/2008 | Prince et al. | 359/831 |
| 7,327,911 B2 | 2/2008 | Piede et al. | |
| 7,471,450 B2 * | 12/2008 | DiMarzio et al. | 359/388 |
| 7,933,056 B2 * | 4/2011 | Tsao | 359/211.3 |
| 2003/0021325 A1 | 1/2003 | Masterson et al. | |
| 2003/0112410 A1 | 6/2003 | Altmann | |
| 2005/0152019 A1 | 7/2005 | Mushika | |
| 2005/0168754 A1 | 8/2005 | Hill | |
| 2005/0174624 A1 | 8/2005 | Greywall | |
| 2005/0195404 A1 | 9/2005 | Carlson | |
| 2005/0212946 A1 | 9/2005 | Mikami | |
| 2006/0146387 A1 * | 7/2006 | Lettington | 359/201 |
| 2007/0159634 A1 | 7/2007 | Englert | |
| 2007/0284502 A1 | 12/2007 | Hsin et al. | |

FOREIGN PATENT DOCUMENTS

| | | |
|---|---|---|
| JP | 61-247026 | 11/1986 |
| JP | 62-212507 | 9/1987 |
| JP | 09-222355 | 8/1997 |

OTHER PUBLICATIONS

Davis, et al., "The Sydney University Stellar Interferometer—I. The instrument," *Monthly Notices of the Royal Astronomical Society*, 1999, 303: pp. 773-782.

Doyle et al., "Refractively Scanned Interferometers for Fourier Transform Infrared Spectrophotometry," *Applied Spectroscopy*, 1980, 34(5): pp. 559-603.

Enard et al., "Progress in ground-based optical telescopes," *Reports on Progress in Physics*, 1996, 59(5): pp. 601-656.

Harlander et al., "Robust monolithic ultraviolet interferometer for the Shimmer instrument on STPSat-1," *Applied Optics*, May 2003, 42(15): pp. 2829-2834.

Prakash, et al., "Cylindrical-lens-based wavefront-reversing shear interferometer for the spatial coherence measurement of UV radiations," *Optical Engineering*, May 2006, 45(5): pp. 0556011-0556016.

Schuller, Peter "Calibration of MIDI, the Mid-infrared Interferometer for the VLTI," Doctoral Disseration, Ruperto-Carola University of Heidelberg, Germany, 2002.

* cited by examiner

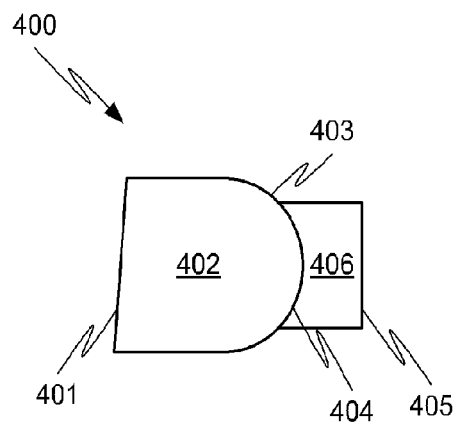
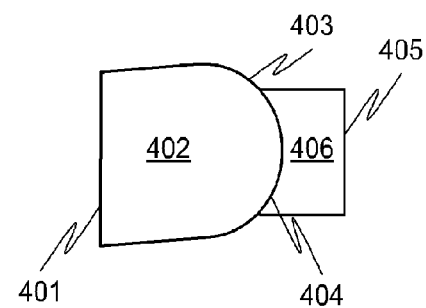
FIG. 4A      FIG. 4B
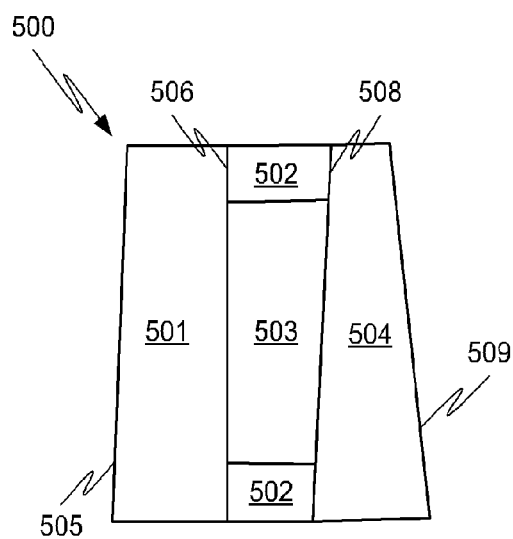
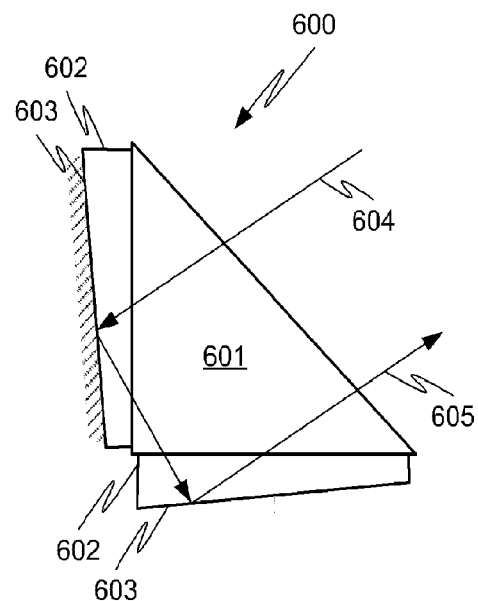
FIG. 5      FIG. 6

HIGH-PRECISION MONOLITHIC OPTICAL ASSEMBLIES AND METHODS FOR FABRICATION AND ALIGNMENT THEREOF

CROSS-REFERENCE TO RELATED APPLICATIONS

The present application claims the benefit of U.S. Provisional Application No. 61/043,056, filed Apr. 7, 2008, which is hereby incorporated by reference in its entirety.

STATEMENT REGARDING FEDERALLY SPONSORED RESEARCH

The present invention was made with U.S. government support under contract no. 0451407 awarded by the National Science Foundation, Division of Astronomical Sciences. The U.S. government has certain rights in the invention.

FIELD

The present disclosure relates generally to methods for fabricating and aligning optical assemblies, and, more particularly, to high-precision monolithic optical assemblies and methods for the fabrication and alignment thereof.

BACKGROUND

A monolithic optical component is a singular device which is relatively compact and has a relatively stable nature. The functionality of the monolithic component is typically incorporated in the formation of the component, such that the monolithic component is adapted into any optical system by performing the same function independent of the optical system. Monolithic optical components are often produced from a single piece of homogeneous material by precisely fabricating each optical surface. Because of this construction, it may enjoy certain homogeneous material properties that allow the monolithic optical component to operate as intended, despite minor environmental perturbations, such as acceleration, temperature fluctuations, and pressure changes.

Despite the recognized performance advantages of using monolithic optical components in high-precision optical systems, there are significant shortcomings to these components, which may affect their selection for particular optical systems. Such shortcomings may include lack of flexibility and high cost. Because the monolithic optical components require a certain amount of homogeneity, the fabricated component may be restricted to function only in a simple configuration. Further, under the exposure of uneven environmental perturbations (i.e., large temperature gradients, unbalanced stress states, etc.), the absolute homogeneity of the component may be undermined, which the monolithic optical component itself may not have the flexibility to correct or compensate for. The monolithic optical component also requires skilled opticians and/or sophisticated equipment to produce the high-quality surface finish, often in multiple dimensions, necessary for a high-precision component. Accordingly, the manufacturing cost can be high even for a component of moderate complexity. As the complexity of monolithic optical components increases, so may the associated costs increase. Any special configurations, ultra-high precision requirements, large size, or increased number of optical-quality surfaces could also dramatically increase manufacturing costs.

As a result, many complex optical systems are constructed as adjustable optical assemblies. For example, separate monolithic components in adjustable or reconfigurable form can allow for the selection components with various material and optical properties. Furthermore, the adjustable assemblies can enable the integration of complex and flexible configurations, which may perform various functionalities, while also allowing for the compensation of environmental perturbations. However, the size and complexity of these adjustable assemblies can be a deterrent in some applications. Moreover, the stability of adjustable systems can be compromised by their flexible and adjustable nature. As these instabilities can be undesirable, active control systems may be required, thus adding to the expense and complexity of adjustable optical assemblies.

A monolithic optical assembly is the integration and attachment of several individual monolithic components, which are precisely aligned to serve as a single optical unit. These individual components may be affixed after alignment. For example, the individual components may be aligned with the assistance of mechanically-adjustable tools or fixtures, after which the components may be secured together in fixed position relative to each other. The fixed position can be reconfigured and re-secured to adapt to different applications, as necessary. Thus, monolithic optical assemblies may combine the benefits of monolithic optical components, and adjustable optical assemblies.

However, there are many challenges in the manufacturing process of a monolithic optics assembly. For example, fixtures and components must be maintained in a high degree of stability during the alignment and securing processes. This includes releasing loaded force and torque from the assembly after the alignment is fixed. In addition, misalignment and drift tendencies caused by non-homogeneous thermal expansion among constructing fixtures and components must be avoided.

Accordingly, there is a need for high-precision optical components that can provide drop-in functionality akin to monolithic optical components, but at a reduced manufacturing cost. There is also a need for a high-precision optical component that combines the stability of monolithic optical components with the flexibility of an adjustable optical assembly.

SUMMARY

Embodiments described herein may address the above-discussed problems and limitations, among other things. High-precision monolithic optical assemblies and methods for fabricating and aligning such assemblies are described herein. An exemplary method for fabricating high-precision optical assemblies includes using low-cost wedge plates or wedge second surface mirrors. By rolling and/or shifting the wedge plates or mirrors relative to each other, a precise alignment solution is found for a particular optical assembly. For example, by rolling wedge plates of a few arc minutes in angular tolerances with respect to each other, a precision alignment solution of less than a few arc seconds may be obtained. That is, rolling of an optical element, such as a wedge plate or wedged second surface mirror, with a small wedge angle can result in an equivalent tilt or turning angle sensitivity on the order of several times to thousands of times greater than the rolling angular displacement.

As referred to herein, rolling refers to the act of rotating one component with respect to another component about a surface normal of the contact surface between the two components. It is further noted that the technique defined is not limited to wedge plates, but is also applicable to other geometries. In general, this technique relates to the control of the relationship of optical surfaces of optical components, which are in direct contact, by relative motion between the components such that the resulting optical properties of the components are controlled in a precise and cost-effective manner.

After achieving a precise alignment solution, the optical components can be bonded together, or held together by temporary means, to form a high-precision monolithic optical assembly, which satisfies the high-precision and stability requirements for many applications. Moreover, the wedge angles and the center thicknesses of the wedge plates employed need not be highly-precise, because the precision of the wedge plates is enhanced by the surface interaction between the wedge plates and the adjustability afforded by the rolling/shifting technique. Thus, the costs required for a highly-precise monolithic optical assembly can be significantly reduced through the appropriate orientation of low-cost optical components with respect to each other. Optical alignment using this technique may be improved by at least an order of magnitude over conventional optical components. The precision optical assemblies made in accordance with this technique would be applicable to a number of optical systems, such as, but not limited to, roof mirrors, etalons, various interferometers, beam splitters, prisms, monolithic laser cavities, retro-reflectors, fiber optic devices, and other alignment sensitive optical assemblies.

The low-cost technique presented herein may overcome many of the manufacturing difficulties associated with fixed optical assemblies that are aligned in high precision, among other things. A fabricated monolithic optical assembly according to the present technique would have almost the same homogeneity and continuity as a monolithic component such that the stability and security are improved. The technique is also applicable to standard optical components to achieve high-precision alignment. The resulting alignment would thus be immune to the perturbations associated with temporary or permanent external fixtures. The technique is also flexible in that components of the monolithic optical assembly can be realigned (or re-programmed) to adapt to different applications or operation environment.

Objects and advantages of the present disclosure will become apparent from the following detailed description when considered in conjunction with the accompanying drawings.

BRIEF DESCRIPTION OF DRAWINGS

Where appropriate, like reference numbers have been used to indicate like elements in the figures. Unless otherwise noted, the figures have not been drawn to scale. Moreover, certain features, such as wedge angles of various components, may be exaggerated in the Figures for illustration purposes.

FIG. 4A-B is a schematic view of an optical assembly, which has contacting matched spherical surfaces, in various states, according to some embodiments of the disclosed subject matter.

FIG. 5 is a schematic view of an optical assembly with a wedged spacer ring between a pair of second surface mirrors, according to some embodiments of the disclosed subject matter.

FIG. 6 is a schematic view of a monolithic retro-reflector, according to some embodiments of the disclosed subject matter.

DETAILED DESCRIPTION

Figure 1A:
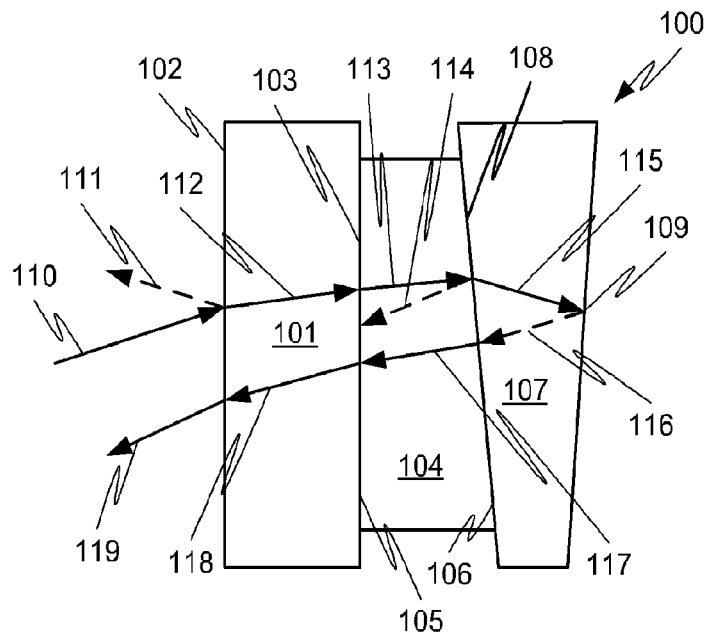
FIG. 1A is a schematic view of an optical assembly with three optical components in an initial state, according to some embodiments of the disclosed subject matter.
Figure 1B:
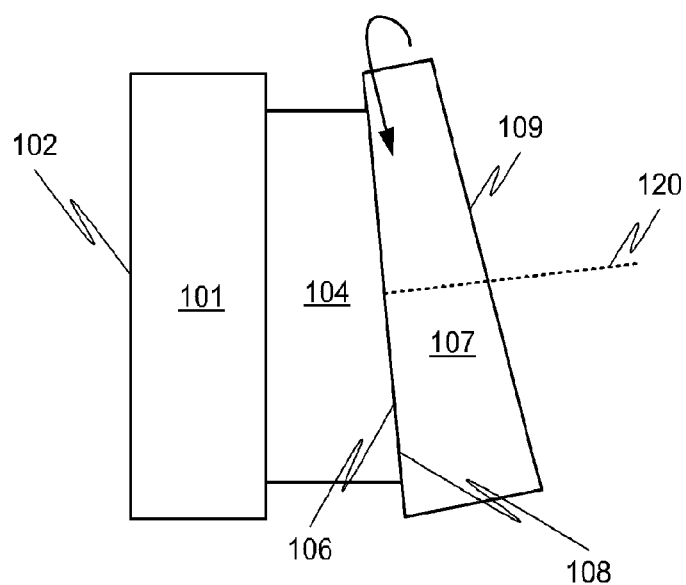
FIG. 1B-1C is a schematic view of the optical assembly of FIG. 1A after rolling of one of the optical components.
Figure 1C:
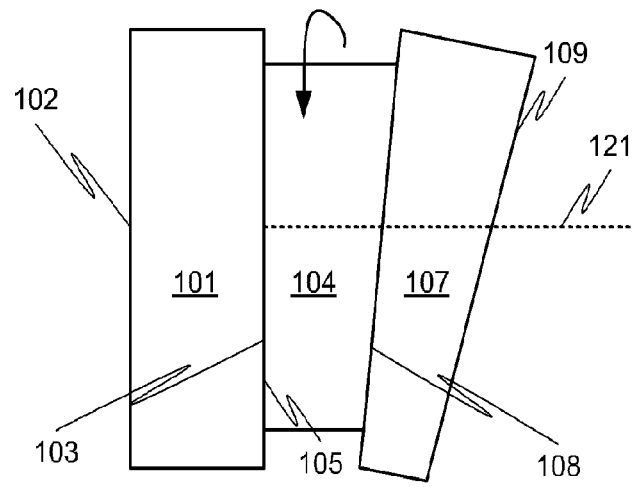

FIGS. 1A-1C illustrate an optical assembly 100 and the rolling process for alignment of the optical assembly, according to the present disclosure. The illustrated arrangement minimizes the usage of redundant components and/or supports. Accordingly, the arrangement is not only simple and compact, but it also achieves a high degree of stability. When a light beam 110 is incident on the assembly 100, the transmitted and/or reflected beams forms a precise alignment relationship, which is required such that the assembly functions in a unique optical manner. Any of the reflecting surfaces of the assembly can be highly reflective, partially reflective, or wavelength-dependent reflective (e.g., a grating surface).

The optical assembly 100 may include position sensitive and position non-sensitive components. As used herein, position sensitive components refers to a component wherein changing a position of the component may cause misalignment, which can subsequently be corrected by moving the component back to its original position. The position sensitive component may be securely attached to other portions of the assembly through a substantial surface contact area.

The components are in contact with each other along matched optical surfaces. These matched optical surfaces are normally highly precise in terms of flatness and curvature for even standard inexpensive optical components, although the components themselves may have an alignment precision (or alignment tolerance) on the order of arc minutes. Examples of these surfaces include, but are not limited to, optically flat, spherical, cylindrical, and other optical conical surfaces. At least one of the two contacting surfaces physically intersects the light path.

One or more position non-sensitive components may be attached to (or in contact with) the optical assembly at any arbitrary position. As used herein, a position non-sensitive component refers to a component wherein changing a position of the component may not affect the alignment or may affect the alignment as a result of structural damage, but the damage cannot be corrected by replacing the component in its original position. For example, a device holder can be a position non-sensitive component.

Among the position sensitive components, there is at least one wedge component, for example, a plate having (i.e., comprising) a small wedge angle or a second surface mirror having a small wedge angle. The wedge component has at least two optically finished surfaces. These wedge components can be manufactured with the intent that the finished optical surfaces are parallel, but large manufacturing tolerances in an effort to minimize manufacturing costs may result in a plate with a slight angle (i.e., wedge angle) between the optical surfaces. Thus, the wedge angle is related to the manufacturing angular tolerances of the component. Smaller manufacturing angular tolerances will result in a component with a smaller wedge angle and thus surfaces more nearly parallel with respect to each other.

For example, FIG. 1A shows an assembly 100 having a first plate 101, a second plate 104, and a third plate 107. As illustrated, plates 104 and 107 are wedge plates while plate 101 is a parallel face plate, although other configurations are possible. First plate 101 has a first surface 102, which can be highly reflective, partially reflective, or wavelength-dependent reflective, and a second surface 103. Second plate 104 has a first surface 105 and a second surface 106. Third plate 107 has a first surface 108 and a second surface 109, which can be highly reflective, partially reflective, or wavelength-dependent reflective.

An incoming ray 110 is partially reflected as ray 111 by surface 102 and partially transmitted and refracted as ray 112. Ray 112 proceeds through plate 101 to surface 103, which is in contact with and corresponds to surface 105 of wedge plate 104. Ray 112 may be refracted and/or reflected by the surface 103 depending on the materials used for plates 101, 104, as would be evident to one of ordinary skill in the art. The transmitted beam 113 proceeds through plate 104 to interact with surface 106, which is in contact with and corresponds to surface 108 of wedge plate 107. Again, ray 113 may be refracted and/or reflected by the surface 106 depending on the materials used for plates 104, 107, as would be evident to one of ordinary skill in the art.

The reflected beam 114 from the surface 106 of the wedge plate 104 thus forms a small angle with respect to the beam 117 from the wedge plate 107. This angle can be tuned based on the orientation of surface 106 and surface 109 with respect to each other. The wedge angle can be smaller than, for example, 6°, and it is typically larger than the angular tolerances for alignment of an optical component, such as a mirror, in the assembly 100. For example, a mirror surface can be required to be aligned within 1° precision in the assembly 100.

To meet the necessary tolerances for the optical assembly 100, the wedge components cannot be at any arbitrary rolling position. Rather, the wedge components 104, 107 are used to align the assembly 100 to the desired tolerances by either rolling around an axis substantially perpendicular to the optical surfaces or by shifting substantially parallel to the optical surfaces. For example, wedge component 107 may be rolled, or rotated about the contact surface normal 120, with respect to wedge component 104 to achieve the configuration in FIG. 1B. As shown in FIG. 1B, the optical surface 109 of wedge component 107 is thus reoriented by the rolling process such that ray 116 would be reflected in a different direction than in FIG. 1A.

In addition, wedge component 104 can also be rolled, with component 107 in contact with surface 106, about the contact surface normal 121 to achieve yet another configuration, as shown in FIG. 1C. Appropriate control of the amount of rolling of any or all of the components of the optical assembly would thus control the resultant direction of ray 119, as well as other rays 114-118 within the assembly, thereby allowing for precise alignment of the optical assembly 100. After the desired alignment is obtained, the components of the assembly may be affixed together to form a highly-precise monolithic optical assembly, which has a precision greater than the alignment tolerances of any of the components.

Each wedge component remains in surface contact with an adjacent optical component through matched optical surfaces. As used herein, matched optical surfaces refer to surfaces on adjacent components with complementary geometry such that the surfaces may move with respect to each other in a precise and controllable manner. The rolling of a wedge component generates a very precise and very controllable angular alignment in purely one dimension. Multiple rolling components can generate de-coupled multidimensional angular alignments in a similar manner. If a pair of matching surfaces is spherical, the rolling of a single wedge component can generate a two-dimensional angular alignment in a controllable manner. In some applications where the optical path difference (OPD) or component thickness is required to within a tight tolerance, a wedged component can shift on a flat surface (e.g., perpendicular to the surface normal of the component) such that the OPD or thickness can be precisely tuned without adversely affecting the angular alignment.

Figures 1D, 1E:
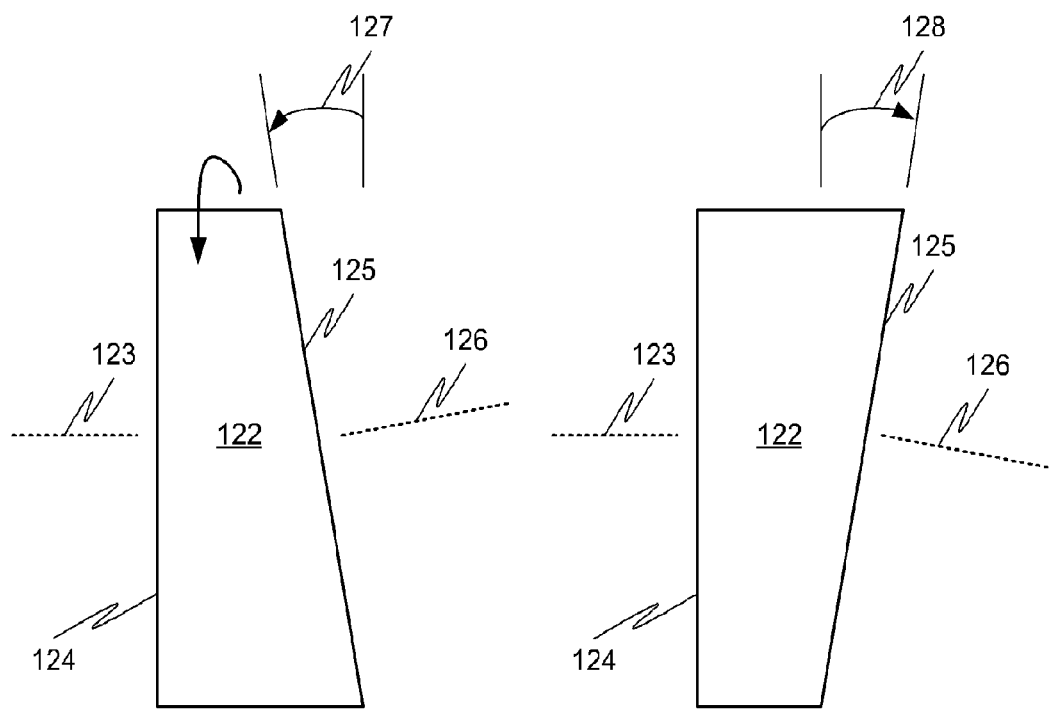
FIG. 1D-1E is a schematic view illustrating the variations in orientation of a wedge plate surface in two different rolling states.

The effect of the disclosed rolling technique on the orientation of wedge-shaped optical components is illustrated schematically in FIGS. 1D-1E. A second surface wedge mirror 122 has a small wedge angle, an input surface 124, a mirror surface 125, and an optical axis 123. As component 122 is rotated about optical axis 123 (i.e., the surface normal of input face 124), the orientation of the mirror surface 125 changes significantly. In the initial state of FIG. 1D, the mirror surface 125 is oriented such that the thinnest edge of the cylindrical mirror is at the highest position and the thickest edge is at the lowest position, such that its surface normal 126 is angled slightly downward. The mirror surface thus forms an angle 127 with respect to vertical. As the optical component 122 is rolled, the direction of the surface normal 126 for the mirror surface 125 correspondingly changes. After a rolling of 180°, the component 122 is in the state shown in FIG. 1E, with the surface normal 126 angled slightly upward such that the mirror surface 125 is effectively tilted with respect to the vertical at angle 128. As the component 122 is further rolled 180°, it returns to the position in FIG. 1D. The changing reflected ray forms a full circle projection on the front surface 124. Thus, an amount of rolling of the component, in effect, results in a change in the direction of reflection of the mirror relative to the optical axis, with the relationship between the amount of rolling and the effective amount of change being proportional to the wedge angle of the component.

For example, in FIG. 1E, initially the thinnest edge of the second surface mirror 122 is at the lowest position such that light travelling parallel to optical axis 123 is reflected by mirror surface 125 toward the top of FIG. 1E. A rolling of the element 122 about axis 123 slightly changes the direction of the reflected light perpendicular to the plane of the page in FIG. 1E. If the wedge angle of the second surface mirror 122 is 6°, a 1° rolling of this element 122 is approximately equivalent to a turning in/out of the reflecting surface 125 at 6°×sin (1°)=0.1°. That is, for each 1° rolling increment, the effective turning angle is one tenth of 1°. Thus, the control of the alignment of the mirror (i.e., the alignment sensitivity) is improved by a factor of ten. If the wedge angle for the second surface mirror is reduced further, even greater alignment sensitivity can be obtained. For example, for a wedge angle of 3 arc min, a 1° turning of the back mirror surface at 3 arc min×sin(1°)=3 arc sec. Thus, the control of the alignment sensitivity is amplified by a factor of about one thousand. Moreover, the overall alignment of an optical assembly incorporating such a wedge component can be adjusted to within a tolerance that is much greater (e.g., by at least an order of magnitude) than the tolerances (i.e., wedge angles) associated with the wedge component.

Appropriate wedge angles for each optical component can be selected to compromise between a higher sensitivity afforded by smaller wedge angles and a larger range of adjustment afforded by larger wedge angles. In addition, a number of wedge plates with angles in different regimes may be coupled together in a single optical assembly to provide both extended tuning range (using large wedge angle components) and high sensitivity (using small wedge angle components). For high precision applications, the wedge angle can be in the arc minutes range or below.

The motion of the wedge components allows for the maintenance of the required alignment of the optical function of the monolithic optical assembly. When the monolithic optical assembly is integrated with other optical components to form a new alignment relationship, the new assembly can perform a new optical function. However, even in the new assembly, the wedge components will maintain their fixed position relative to the rest of the monolithic optical assembly during the alignment procedures for the new assembly.

Figure 2A:
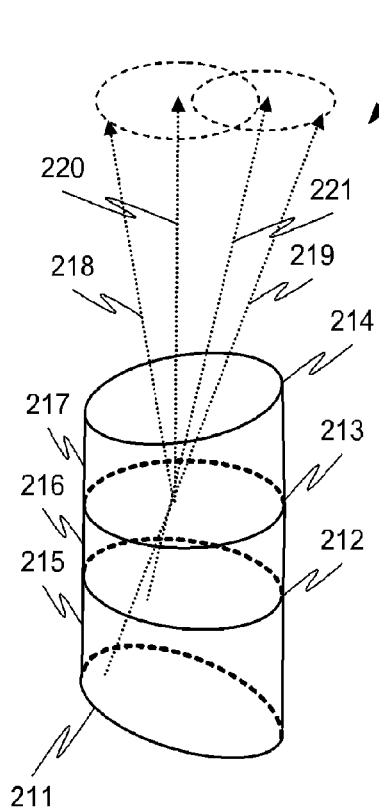
FIG. 2A is a schematic of an optical assembly with a central wedge plate between a pair of second surface mirrors, according to some embodiments of the disclosed subject matter.
Figure 2C:
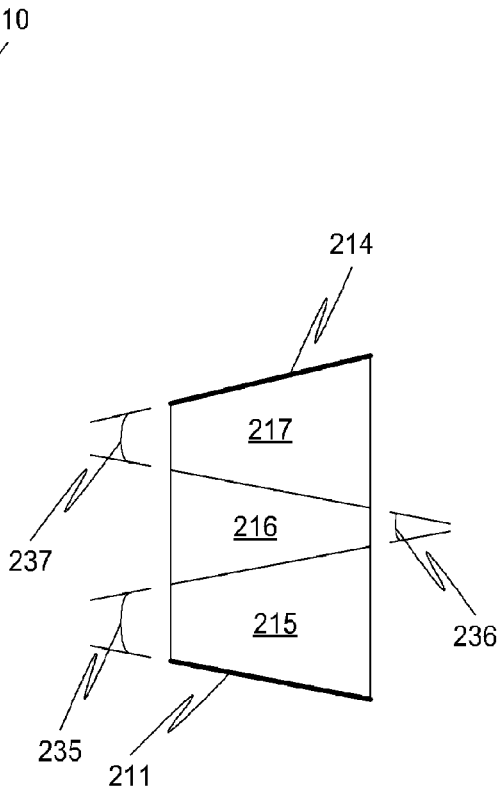
FIG. 2C is a schematic view of the optical assembly of FIG. 2A.

FIGS. 2A and 2C show an optical assembly 210 in the form of a monolithic Fabry-Perot etalon or interferometer. The Fabry-Perot etalon may include a first wedge mirror 215, a second wedge mirror 217, and a transmission wedge plate 216. As illustrated, the first wedge mirror 215 has a reflecting mirror surface 211 and a wedge angle 235. Likewise, the second wedge mirror 217 has a reflecting mirror surface 214 and a wedge angle 237. The first wedge mirror 215 abuts the wedge plate 216 on a first contact surface 212 of the wedge plate 216. The second wedge mirror 217 abuts the wedge plate 216 on a second contact surface 213 of the wedge plate 216. The wedge plate 216 also has a wedge angle 236. The contact surfaces between the wedge mirrors 215, 217 and the wedge plate are optically flat such that there are no gaps that exist between the contact surfaces.

Figure 2B:
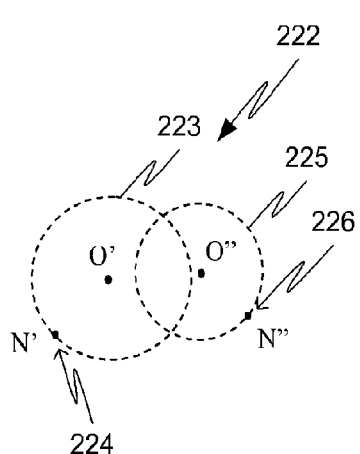
FIG. 2B shows the path of the surface normals of the components of the optical assembly of FIG. 2A during rolling.

In FIG. 2B, the normal vectors 218-221 of the total four surfaces 211-214 are shown. Note that first normal vector 219 corresponds to the reflecting mirror surface 211 of the first wedge mirror 215, the second normal vector 221 corresponds to the first contact surface 212 of the wedge plate 216, the third normal vector 220 corresponds to the second contact surface 213 of the wedge plate 216, and the fourth normal vector 218 corresponds to the reflecting mirror surface 214 of the second wedge mirror 217.

If the first wedge mirror 215 and the second wedge mirror 217 are rolled relative to the fixed middle plate 216, the reflecting surface normal vectors (224 and 226 in FIG. 2B) will revolve around the middle plate normal vectors O' (top surface of the 216 plate) and O" (bottom surface of the 216 plate). As shown graphically in the schematic 222 of FIG. 2B, the fourth normal vector 218 will project a point 224 on circle 223, which is centered on O', while the first normal vector 219 will project a point 226 on circle 225, which is centered at O". The radii of the circles scale equally to the first wedge angle 235, $\alpha_1$, and the second wedge angle 237, $\alpha_3$, and the separation between the centers of the circles also scale equally to the wedge angle 236, $\alpha_2$, of the middle wedge plate 216. For the purposes of illustration, it is assumed the refractive indices are equal, although in practice the refractive indices may vary between the different components. If both conditions $\alpha_1+\alpha_3>\alpha_2$, and $\alpha_1-\alpha_3<\alpha_2$ are satisfied, these two circles will intersect at two points. Thus, reflecting mirror surface 214 of the second wedge mirror 217 and the reflecting mirror surface 211 of the first wedge mirror 215 can be aligned parallel by rolling any two of the components with respect to the third component.

Many optical assembles require a precise alignment of two reflecting surfaces near the perfect parallel region. For example, if reflecting surfaces 211 and 214 have low-loss high-reflection coatings, assembly 210 would be a high-finesse Fabry-Perot interferometer when the reflecting surface 211 of the first wedge mirror 215 and the reflecting surface 214 of the second wedge mirror 217 are aligned parallel with high precision. The plates may contain a laser gain medium, such that the assembly 210 can serve as a basic Fabry-Perot laser cavity.

As is evident from the discussion above, the rolling alignment process is relatively easy and does not require advanced tools or fixtures. The precision and stability of the alignment will be mainly determined by the flatness of the surfaces. It is preferable to use components of the same material such that the thermal-mechanical homogeneity and continuity guarantee the long term stability of the assembly. However, in the case of using different materials for the components, thermal coefficients of expansion can be matched so as to achieve long term stability.

As previously referenced, this technique may be applied to standard optical components (i.e., components that do not have high optical precision) to achieve a high-precision monolithic optical assembly. Applying this technique to merely standard optics components, approximately 1 arc second angular precision is achievable within 1" diameter clearance aperture. Higher precision levels can be achieved by selecting optics of above average quality at a modest cost increase. Note that the resulting alignment precision of the optical assembly after rolling is improved over the initial orientation of the components and is generally better than any of the tolerances of the components.

In addition, the benefits of a monolithic etalon or laser cavity component assembled according to the above methods are more than just the lower technical threshold required and lower manufacturing cost achieved. As discussed in more detail below, the method also allows for flexibility and programmability which can be very useful in dynamic applications. For example, in a laser cavity where the temperature gradient depends on the pumping condition, the wedge mirrors 215, 217 may be rolled slightly to compensate for misalignment caused by changes in pumping conditions. Control systems can adjust the rolling of the mirrors 215, 217 to optimize optical performance, such as laser output.

Components for the optical assembly are not limited to solid optical glasses. Rather, optical materials, such as polymers, and/or configurations, such as lenses or optical fibers, are also possible according to one or more contemplated embodiments. Additional materials and configurations not described herein are also contemplated. Furthermore, the embodiments of the monolithic optical assembly are not limited to wedge or wedge-shaped components. In general, methods discussed herein may be effective with contacting optical components, wherein at least one of the components has a variable thickness and/or a variable refractive index along a direction perpendicular to a central axis thereof. Thus, by changing the relative orientation of the components, the direction of reflected or refracted rays can be altered to achieve a precise alignment solution.

Figure 3:
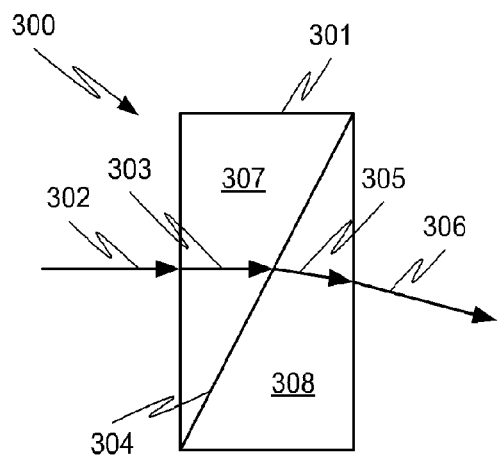
FIG. 3 is a schematic view of a plate material having a variable index of refraction that can be used in a monolithic optical assembly, according to some embodiments of the disclosed subject matter.

For example, in FIG. 3, an optical element 300 can be used in place of a wedge plate of the embodiments of FIGS. 1-2. In such a configuration, a plate 301 is made of a material or combination of materials such that, for example, the refractive index transitions from one value in a first region 307 to another value in a second region 308 with an interface 304 therebetween. The plate 301 may have input and output surfaces arranged parallel with respect to each other (or can be parallel to within a tolerance on the order of several arc minutes). The refractive index transition can deflect an incoming beam 302 travelling in region 307 as ray 303 into ray 305 travelling in region 308, much in the same manner as a wedge plate of uniform material. A multi-step or smooth index gradient material can be applied for a similar purpose. A parallel-bonded assembly 300 can replace component 104 in FIGS. 1A-1C. Such a configuration has the added benefit that the rolling of assembly 300 does not change the physical position of elements 101 and 107.

In another example, an optical assembly 400 uses matched spherical surfaces, as shown in FIGS. 4A-B. A first optical component 402 has a spherical surface 403, which is matched to and in contact with spherical surface 404 of a second optical component 406. First optical component 402 may have a first mirror surface 401, and second optical component 406 may have a second mirror surface 405. Thus, assembly 400 may function as a Fabry-Perot etalon. By moving the first optical component 402 relative to the second optical component 406, or vice-versa, first mirror surface 401 and second mirror surface 405 may be precisely aligned parallel with respect to each other. For example, the first optical component 402 may be rolled in contact with surface 404 until mirror surface 401 is parallel to within arc second tolerance with respect to mirror surface 405, as shown in FIG. 4B.

In still another example, one or more of the components can be a ring-type spacer 502, as shown in FIG. 5. A wedged spacer ring 502 is arranged between a first optical component 501 and a second optical component 504. The wedged spacer ring 502 is sandwiched between contact surface 506 of optical component 501 and contact surface 508 of optical components 504. A medium 503, which may be in the form of a gas, liquid, gel, or reformable solid compound, can be enclosed by ring 502. Depending on the application, the spacer can take various shapes, such as an open C-shape. Opposing the contact surface 506 of the first optical element 501 is a first mirror surface 505. Similarly, second optical element 504 has a second mirror surface 509 that is opposite to contact surface 508. By rolling the wedged spacer ring 502 relative to the first optical component 501 and the second optical component 504, the first mirror surface 505 and the second mirror surface 509 can be adjusted so as to be parallel with respect to each other, or, alternately, to achieve a desired angle between the surfaces.

In yet another embodiment of the disclosed subject matter, the rolling technique can be applied to a flexible optical waveguide, such as optical fibers. In such a configuration, one or more wedge plates may be coupled to an end of the optical fiber. The wedge plates may be rolled so as to achieve a precision alignment solution for the end of the fiber, after which the wedge plates and the fiber ends may be joined together. Any movement of the middle portion of the optical fiber (i.e., away from the ends of the optical fiber) would not affect the alignment since the fiber ends or a monolithic fiber collimator are typically in fixed positions during use.

FIG. 6 shows a monolithic retro-reflector optical assembly 600 according to some embodiments of the disclosed subject matter. Two wedge-shaped optical components 602 have second surface mirrors 603, which are used to assist in the alignment of the retro-reflector optical assembly 600. The reflecting surfaces 603 of these two mirrors can be rolled to precisely form a 90° angle, so the reflected light 605 is always parallel to an incident light 604 in any arbitrary incident angle. Once an appropriate alignment is achieved, the components can be bonded or otherwise affixed to form a monolithic retro-reflector, which will perform the optical function of the retro-reflector irrespective of the optical system in which it is installed.

Figure 7:
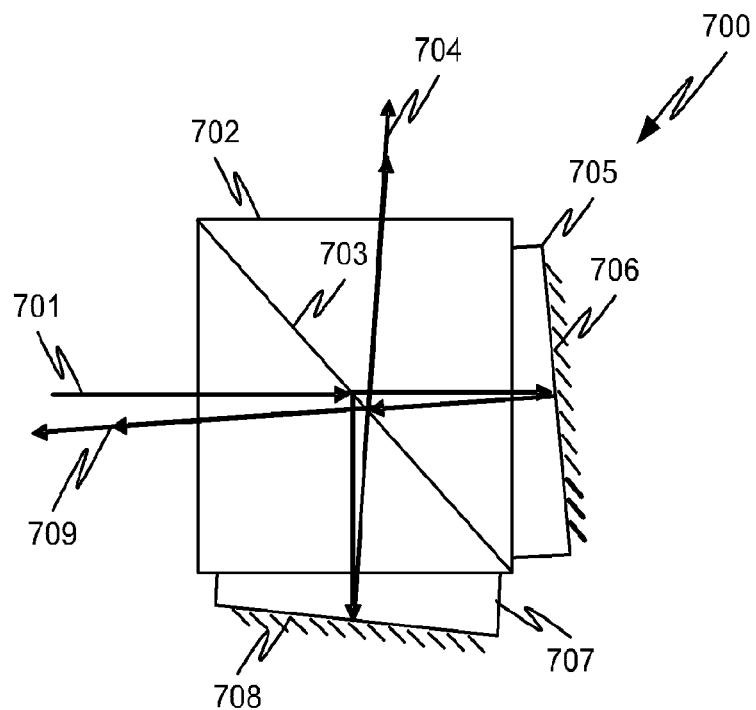
FIG. 7 is a schematic view of a monolithic Michelson interferometer, according to some embodiments of the disclosed subject matter.

FIG. 7 shows a monolithic Michelson interferometer 700 according to some embodiments of the disclosed subject matter. Similar to the description above, a first wedge plate 705 has a second surface mirror 706 provided opposite a surface contacting optical component 702. Similarly, a second wedge plate 707 has a second surface mirror 708 provided opposite a surface contacting optical component 702. The first wedge plate 705 and the second wedge plate 707 can thus be used to assist in the alignment of the Michelson interferometer 700. The Michelson interferometer 700 has an optical component 702 with a semi-transparent mirror 703, which separates incident light into transmitted and reflected light paths. An interference pattern may then be produced by recombining the beams that have traversed a first light path 704 and a different second light path 709. The second surface mirror 706 and the second surface mirror 708 can optimize alignment of the interferometer, as needed, through rolling of the respective first wedge plate 705 and second wedge plate 708. The precise angular alignment is achieved by rolling of the mirrors to generate desired interference patterns. In addition, the wedge mirrors can also shift laterally to finely tune the OPD of the interferometers, while keeping the angular alignment intact. This has applications to white light interferometry, where absolute zero OPD is often desired in addition to the high precision angular alignment requirement.

The Michelson interferometer has particular applications for astronomy. For example, extra-solar planetary searches require a highly stable and precisely aligned fixed delay Michelson interferometer. This interferometer plays a very critic role in determining the Doppler shift of stellar spectra. This applications requires that interference fringes are oriented parallel to the light propagation direction with a fringe separation of 2.5 mm. To meet this requirement, mirrors have to be aligned with less than 2 arc sec angular precision. As previously referenced, the price of a custom-built near monolithic Michelson interferometer is very high.

For the Michelson interferometer of FIG. 7, the wedge component mirrors may be vendor-listed standard parallel second surface mirrors. Although referenced as parallel, the standard (i.e., low precision) nature of these mirrors provides wedge angles between the front and back surfaces in the ranges of 2 to 4 arc min. The cube beamsplitter may be a standard beamsplitter with a 5 arc min angular displacement. However, by using the disclosed rolling technique with the second surface mirrors, the mirrors can be aligned to compensate for any variations from the ideal alignment. The tolerances of the rolling positions (i.e., the ability to control the rolling position) are typically larger than 1°. Interference fringes produced by light interacting with the assembly may be monitored and orientation of the mirrors adjusted by rolling to achieve a desired pattern. Using an expanded He—Ne laser beam as a coherent source, the interference fringes may be monitored with a CCD camera mounted on the chassis. The interference pattern, indicative of the alignment of the optical assembly, can be stable within 1/100 fringes over days of continuous monitoring.

The three components may be clamped together in a chassis (e.g., a metal framework, such as an aluminum clamp)

with moderate pressure without effect on the interference pattern and thus the alignment. Alternatively, the components can be bonded or otherwise affixed to form a monolithic Michelson interferometer, which will perform the optical function of the interferometer irrespective of the optical system in which it is installed.

Figure 8:
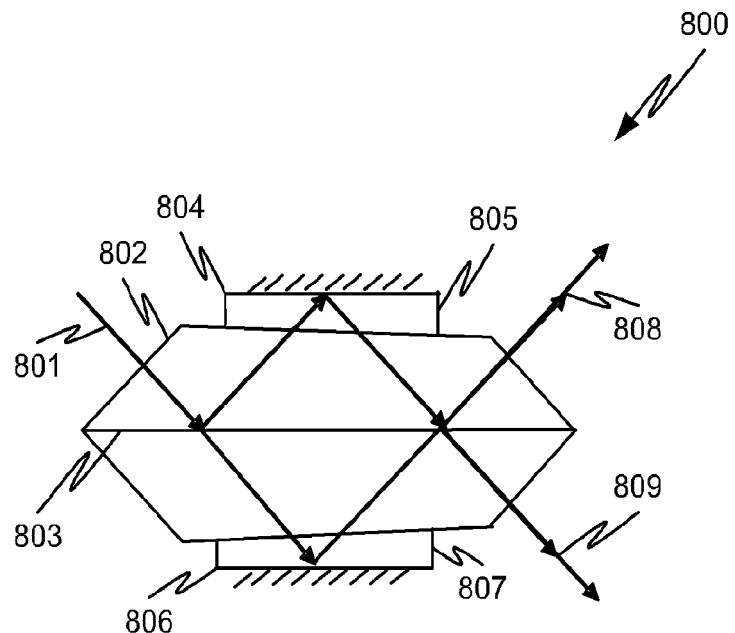
FIG. 8 is a schematic view of a monolithic Mach-Zehnder interferometer, according to some embodiments of the disclosed subject matter.

FIG. 8 shows a monolithic Mach-Zehnder interferometer optical assembly 800 according to some embodiments of the disclosed subject matter. Similar to the description above, a first wedge plate 805 has a second surface mirror 804 provided opposite a surface contacting optical component 802. Similarly, a second wedge plate 807 has a second surface mirror 806 provided opposite a surface contacting optical component 802. The first wedge plate 805 and the second wedge plate 807 can thus be used to assist in the alignment of the Mach-Zehnder interferometer 800. The Mach-Zehnder interferometer 800 may have an optical component 802 with a semi-transparent mirror 803, which separates incident light into transmitted and reflected light paths. An interference pattern may then be produced by recombining the beams that have traversed a first light path 808 and a different second light path 809.

The second surface mirror 804 and the second surface mirror 806 can optimize alignment of the interferometer, as needed, through rolling of the respective first wedge plate 805 and second wedge plate 807. The precise angular alignment is achieved by rolling of the mirrors to generate desired interference patterns. In addition, the wedge mirrors can also shift laterally to finely tune the OPD of the interferometers, while keeping the angular alignment intact.

To permanently fix the adjusted optical assembly, a surface bonding process may be performed. Misalignment during the bonding process is generally of minimal concern since the surface-to-surface attachment between components is sufficiently stable such that alignment is maintained even under aggressive bonding and curing operations. For example, the contacting surfaces can be bonded with ultra-violet (UV) optics glue or epoxy. After curing and aging of the optics glue in the UV technique, a high stability is achieved. An optical assembly constructed in this manner can act the same as a monolithic component in terms of high stability against shocks over an extended period of time, e.g., several years. With such a technique, the resulting UV bond may be subsequently dissolved at a later time should the need arise for reconfiguration of the components.

In addition to bonding using a separate glue or epoxy, optical contact bonding may also be used. Optical contact bonding is a method where the interfacing surfaces of two components are polished to extremely high flatness (several nanometers) before they are contacted. The close proximity of the flat surfaces causes the van der Waals forces to form a strong bond between the components without any adhesives. The lack of a layer of adhesive between components is beneficial, mainly because the thickness of the adhesive layers does not have to be controlled during fabrication, which simplifies the "self alignment" during fabrication of the monolithic optical assembly. In order to get a strong bond and to avoid stresses due to unequal thermal expansion, the optical components may be made from the same material.

For some monolithic optical assemblies, affixing components together in a temporary fashion, such as by holding or clamping, can provide added flexibility not necessarily afforded by a bonding technique. For example, with UV optics glue, dissolution of a UV bond may not be sufficiently quick to allow on-the-fly system reconfiguration to account for changing optical system properties. With optical contact bonding, the resultant strong bond between optical component surfaces leads to the risk of component damage should the optical assembly need to be disassembled. Accordingly, a clamping system can be used to hold the optical components in a fixed orientation achieved by the disclosed rolling/shifting alignment technique to thereby serve as a monolithic optical assembly for use in any optical system. The clamping system can be configured to allow for quick release, such that the optical components in the optical assembly can be rearranged.

Figure 9:
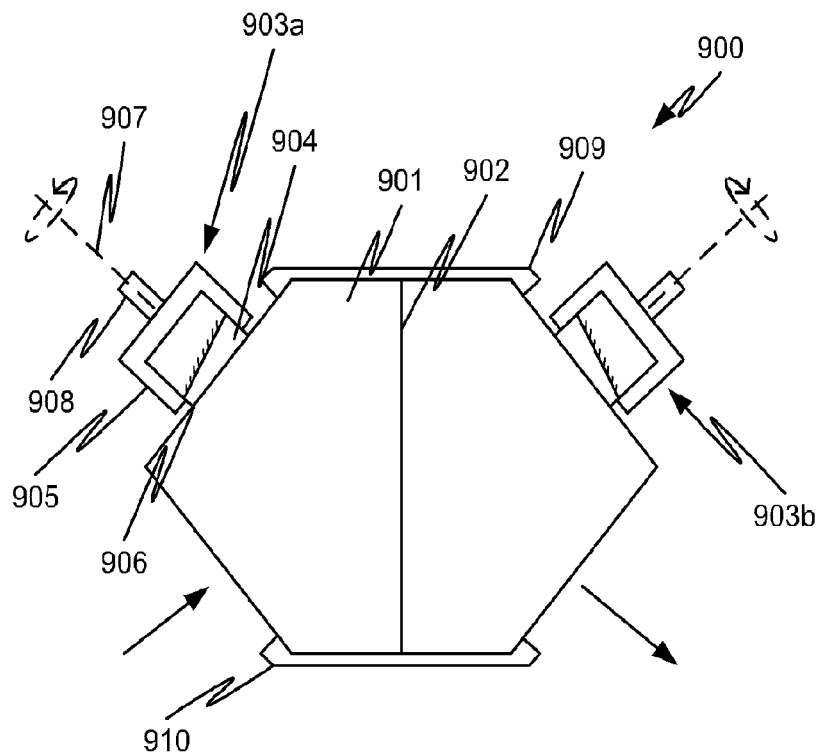
FIG. 9 is a schematic view of an interferometer with a compression force holding fixture, according to some embodiments of the disclosed subject matter.

FIG. 9 is a schematic view of an interferometer employing an exemplary clamping system according to some embodiments of the disclosed subject matter. Interferometer 900 includes an optical beamsplitter 901 with a semi-transparent mirror 902, a first leg portion 903a, and a second leg portion 903b. The first leg portion 903a includes a plurality of optical components according to the intended function of the interferometer. The interferometer configuration is similar to the Michelson interferometer shown in FIG. 7, but the corners of the beamsplitter have been chamfered so that pressure and counter pressure contacts can be conveniently applied. Wedged second surface mirrors 904 are secured in mirror holders 905, which are connected to rolling actuators 908 such that the orientations of the mirrors 904 can be adjusted with respect to the beamsplitter 901.

Optimal interferometer alignment is achieved by rolling one or both mirror holders 905 about a contact normal 907 between the mirrors 904 and the beamsplitter 901. Constant pressure is evenly applied to the mirror holders 905 such that the mirrors 904 are securely pressed against the beamsplitter 901. Similar to the arrangement of rolling actuators 908, linear translation actuators can be incorporated to precisely tune the OPD of the interferometer by shifting one or both mirror holders 905 parallel to the contact surface 906.

A thin layer of index matching oil can be applied between the contact surfaces 906. The index matching oil can provide lubrication, prevent and/or reduce optical contact bonding, and eliminate and/or reduce undesired reflections, among other functions. In high power applications, the index matching oil may not be acceptable due to a low damage threshold. Surface treatments for the contacting surfaces, i.e., oxidation, ionization, or thin film coatings, may also be applied as necessary to prevent and/or reduce optical contact bonding.

The compression force applied by the mirror holder 905 may be applied by any method known to one of ordinary skill in the art. For example, the compression force may be applied via a spring with reproducible compression force to assure an equal amount of compression force each time an interferometer is assembled and a lapped metal interface surface that avoids isolated pressure or stress points in the optical component. Optional counter force application pieces 909, 910 may be included to oppose the force applied by the mirror holder 905 and to hold the beamsplitter 901 in a fixed orientation. Counter force application pieces 909, 910 may not be necessary if, for example, beamsplitter 901 is rendered immobile.

Other configurations and selection for optical components in the first leg portion 903a are also possible. For example, one or more of the optical components can include an optical grating, a field-widening prism, a transmission wedge plate, and a second surface mirror. Second leg portion 903b can have optical components selected and configured in a similar manner to the first leg portion 903a. Moreover, the components in the second leg portion 903b are held to the beamsplitter 901 by a similar arrangement of retaining portions, as discussed above for the first leg portion 903a.

Determination of alignment may be provided by optical feedback techniques. For example, this can be done based on position detection of an output beam for a given input beam. In the case of a Fabry-Perot etalon, this may also be done by monitoring for a peak intensity condition corresponding to a resonant condition achieved by light interference between the parallel mirrors. Interference patterns may also be monitored in certain applications to determine the orientation of the mirrors. Other techniques known in the art for monitoring alignment between optical components are also contemplated.

Figure 10:
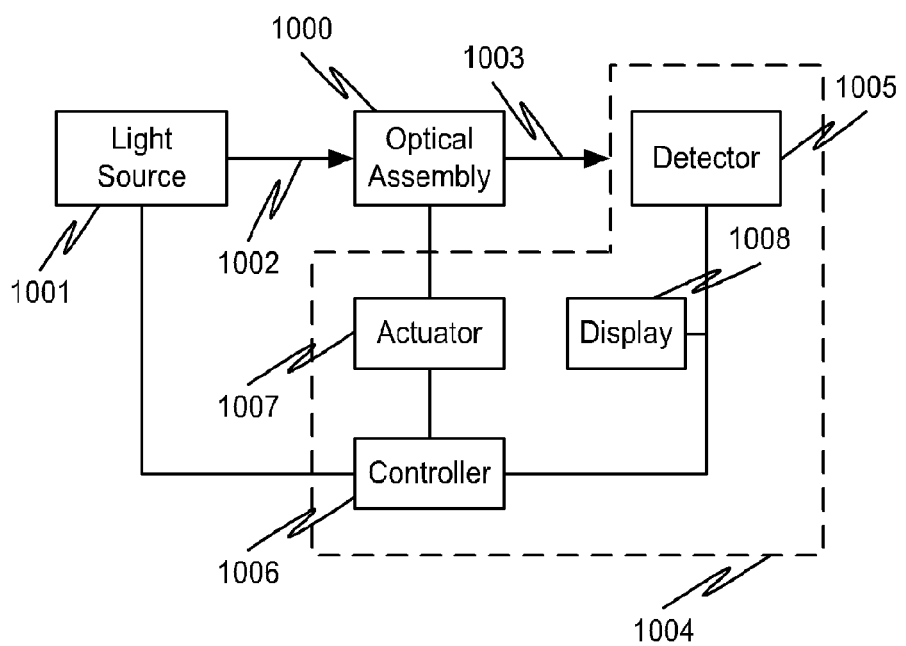
FIG. 10 is a diagram of an optical arrangement for a monolithic optical assembly, according to some embodiments of the disclosed subject matter.

FIG. 10 illustrates a configuration for determining alignment using optical feedback. One or more of a plurality of optical components in an optical assembly 1000 can be manipulated using the disclosed rolling method until a desired alignment precision of the optical assembly 1000 is obtained. The optical assembly 1000 can be arranged to receive input light 1002 from a light source 1001. The light 1002 from the light source 1001 is altered by the optical components of the optical assembly 1000 to thereby generate output light 1003. Characteristics of the resulting output light 1003 are dependent upon the relative orientation of the optical components in the optical assembly 1000 and thus the alignment of the overall optical assembly 1000. A monitoring system 1004 is provided to receive the output light 1003 and to determine the alignment of the optical assembly 1000 therefrom.

The monitoring system 1004 includes a detector 1005 arranged to receive the output light 1003 from the optical assembly 1000 and to generate a signal indicative of the output light received. For example, the signal can be, but is not limited to, an interference pattern signal, an intensity signal, or a position signal. A controller 1006 is arranged to receive the signal from the detector 1005 and to interpret an alignment of the optical components in the optical assembly 1000 based on the signal. The controller 1006 uses such information to determine appropriate adjustments to one or more of the optical components in the optical assembly 1000. The controller 1006 commands an actuator 1007 to manipulate one or more of the optical components in the optical assembly 1000 to achieve a desired alignment of the optical assembly 1000. The actuator 1007 can take the form of any displacement or rotation mechanisms known in the art capable of producing the relative rolling motion between optical components described herein. For example, the actuator 1007 can be a computer-controlled rotational manipulator. The controller-actuator-detector arrangement thus serves as a feedback loop to achieve a desired alignment solution for the optical components in the optical assembly 1000.

It is also noted that the alignment of the components in the optical assembly need not be performed by automated means. Rather, the disclosed method may just as easily be performed by an operator with or without precision control actuators. For example, light source 1001 can illuminate optical assembly 1000 such that detector 1005 receives the output light 1003. An optional display 1008 can be provided to allow the operator to visualize the output light 1003 and changes thereto. The operator can thus roll one or more of the optical components of the optical assembly 1000 until a precise alignment solution, as evidenced by a desired light output characteristic on display 1008, is achieved for the optical assembly 1000. The operator can then affix the optical components in the desired orientation. Alternatively, the operator can mark the optical components so as to note their respective orientations for affixing to each other at a later time.

If the output light 1003 and changes thereto can be readily ascertained by the operator without the detector 1005, detector can also be rendered optional. For example, an interference pattern may be readily viewable by the operator on a screen. In another example, other optical components, such as a prism or interferometer, may be used in place of the detector to allow recognition by an operator of changes in the light output 1003.

Any number of output light characteristics may be monitored according to the desired functionality of the optical assembly 1000. For example, when the optical assembly 1000 is configured as a monolithic Fabry-Perot etalon, manipulation of the optical components in the assembly may be performed to achieve a peak intensity condition corresponding to a resonant condition achieved by light interference between the parallel mirrors. When the optical assembly 1000 is an interferometer, interference patterns may be monitored which are indicative of the relative orientation of mirrors in the optical assembly 1000. When the optical assembly 1000 is a retro-reflector, a position of an output beam may be monitored. Other techniques known in the art for monitoring alignment between optical components are also contemplated.

The disclosed technique is also applicable to real-time control of optical systems to account for variations, either in the monolithic optical assembly or in other parts of the optical system. Thus, the technique can allow for flexibility and programmability, which may be useful in a given dynamic application. For example, in a laser cavity where the temperature gradient depends on the pumping condition, wedge mirrors in the laser cavity may be rolled slightly, either by hand or by an actuator, to compensate for the effective misalignment caused by changes in pumping conditions. Control systems may be implemented accordingly to adjust the rolling of the mirrors to optimize optical performance, such as laser output. The optical components of the laser cavity may be held together, for example, by using a releasable clamping module as discussed with respect to FIG. 9 above, such that the components in the laser cavity can be reconfigured either manually or automatically to compensate for temporal changes. The arrangement of control system and laser cavity may take the form illustrated in FIG. 10, with light source 1001 being a sensing beam or laser emission itself, optical assembly 1000 being the laser cavity, and monitoring system 1004 being the control system for adjusting mirrors in optical assembly 1000 to optimize optical performance of the system.

Although Michelson, Mach-Zehnder, and Fabry-Perot optical arrangements have been described herein, it should be evident to one of ordinary skill in the applicable arts that the disclosed rolling techniques may be applied to various configurations of optical components, such as various interferometers and ring-type laser cavities, for example. It should also be apparent to a person having ordinary skill in the applicable arts that this technique may be applied to prepare the surfaces of other optical assemblies, such as roof mirrors, roof prisms, parallel plates, and mirrors in a specific angular arrangement. It should also be readily apparent that the disclosed technique may be performed by automated methods as well as by manual methods. In addition, although specific embodiments have been described herein using a particular number and configurations of wedge plates, Applicants contemplate that other numbers and configurations of wedge plates may be used in accordance with the principles described herein. It should also be readily apparent, that the disclosed rolling techniques can be used at any arbitrary angle (i.e., different from parallel) as may be dictated by the requirements of one or more applications.

It is, thus, apparent that there is provided, in accordance with the present disclosure, high-precision, low-cost monolithic optical assemblies and methods, systems, and devices for fabricating such monolithic optical assemblies. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

The invention claimed is:

1. A method for assembling a monolithic optical assembly, the monolithic optical assembly including at least three optical elements with adjacent surfaces in contact, the method comprising:
displacing a first of the at least three optical elements, relative to and in contact with a second of the at least three optical elements, from a first orientation to a second orientation relative to the second of the at least three optical elements,
wherein an alignment precision of the monolithic optical assembly is improved with the first of the at least three optical elements in the second orientation over the first of the at least three optical elements in the first orientation.

2. The method of claim 1, the first of the at least three optical elements having a variable thickness or a variable refractive index along a direction perpendicular to a central axis of the first of the at least three optical elements.

3. The method of claim 1, the at least three optical elements having an angular tolerance greater than or equal to 1 arc minute.

4. The method of claim 1, the monolithic optical assembly being aligned with respect to an optical function thereof to within 10 arc sec tolerance with the first of the at least three optical elements in the second orientation, the monolithic optical assembly being aligned with respect to an optical function thereof to a tolerance greater than 10 arc sec with the first of the at least three optical elements in the first orientation.

5. The method of claim 1, wherein the displacing includes rotating the first of the at least three optical elements with respect to the second of the at least three optical elements about a surface normal of a contact surface between the first and second of the at least three optical elements.

6. The method of claim 1, wherein the first of the at least three optical elements has a first surface adjacent to and in contact with a second surface of the second of the at least three optical elements, the first and second surfaces being matched optical surfaces.

7. The method of claim 1, wherein the first of the at least three optical elements has a first surface adjacent to and in contact with a second surface of the second of the at least three optical elements, the first and second surfaces being coplanar and in contact throughout the displacing.

8. The method of claim 1, further comprising bonding the at least three optical elements together with the first of the at least three optical elements in said second orientation.

9. The method of claim 1, wherein the at least three optical elements includes a pair of second surface mirrors and a transmission wedge plate.

10. The method of claim 1, the at least three optical elements includes a second surface mirror.

11. The method of claim 1, the at least three optical elements includes a transmission wedge plate.

12. The method of claim 1, wherein a third of the at least three optical elements is in contact with the second of the at least three optical elements, and further including displacing the third of the at least three optical elements relative to and in contact with the second of the at least three optical elements from a third orientation to a fourth orientation relative to the second of the at least three optical elements, the alignment precision of the monolithic optical assembly being improved with the third of the at least three optical elements in the fourth orientation over the third of the at least three optical elements in the third orientation.

13. The method of claim 12, wherein the at least three optical elements includes a pair of second surface mirrors and one of a prism and a beamsplitting element.

14. The method of claim 1, wherein the monolithic optical assembly comprises one of a monolithic interferometer, a monolithic etalon, a roof mirror, a retro-reflector, a beamsplitter, a prism, and a fiber optic assembly.

15. A monolithic optical assembly comprising:
at least one first optical component, each first optical component having one or more first optical surfaces;
at least two second optical components, each second optical component having one or more second optical surfaces, each second optical surface being matched to and in contact with a respective one of the first optical surfaces,
the relative orientation between the first and second optical components being such that, in combination, the first and second optical components are aligned with respect to an optical function of the monolithic optical assembly to a tolerance that is at least an order of magnitude greater than an angular tolerance of any of the first and second optical components.

16. The assembly of claim 15, wherein the alignment precision of the combination of the first and second optical components is independent of an optical system in which the monolithic optical assembly is installed.

17. The assembly of claim 15, wherein the angular tolerance of each of the first and second optical components is on the order of 1 arc minute.

18. The assembly of claim 15, wherein the tolerance of the combination of the first and second optical components is less than 10 arc seconds.

19. The assembly of claim 15, wherein at least one of the first and second optical components is a wedge plate.

20. The assembly of claim 15, wherein at least one of the first and second optical components is a wedge-shaped second surface mirror.

21. The assembly of claim 15, wherein the at least one first optical component is a prism, the at least two second optical components are two second surface mirrors, and the first and second optical components together form a monolithic retro-reflector.

22. The assembly of claim 15, wherein the at least one first optical component is a beamsplitter, the at least two second optical components are two second surface mirrors, and the first and second optical components together form a monolithic interferometer.

23. The assembly of claim 15, wherein the at least two second optical components are two second surface mirrors, the at least one first optical component is a transmission wedge plate, and the first and second optical components together form a monolithic etalon.

24. The assembly of claim 15, the at least two second optical components being a top second surface mirror with a wedge angle of $\alpha_1$ and a bottom second surface mirror with a wedge angle of $\alpha_3$, the at least one first optical component being a transmission wedge plate with a wedge angle of $\alpha_2$, the transmission wedge plate being arranged between the top and bottom second surface mirrors, wherein the wedge angles satisfy the conditions:

$$\alpha_1+\alpha_3>\alpha_2 \text{ and } \alpha_1-\alpha_3<\alpha_2.$$

25. A method for configuring a monolithic optical assembly comprising:
  monitoring an output of an optical system having the monolithic optical assembly, the output being indicative of an alignment of the monolithic optical assembly, the optical assembly having a first optical element with a first contact surface and a second optical element with a second contact surface, the first and second optical elements contacting each other along the first and second contact surfaces, and
  responsive to said monitoring, altering a relative orientation of the first optical element with respect to second optical element, the first and second contact surfaces being parallel to each other throughout the altering,
  wherein the optical output includes one of an interference pattern and a laser beam output characteristic.

26. The method of claim 25, wherein the altering includes altering the relative orientation of the first optical element with respect to the second optical element so as to obtain a first interference pattern for the optical output, and the first interference pattern is indicative of the monolithic optical assembly being aligned with respect to an optical function thereof to within a 10 arc sec tolerance.

27. The method of claim 25, wherein the altering includes altering the relative orientation of the first optical element with respect to the second optical element so as to obtain a predetermined laser beam output characteristic for the optical output.

28. The method of claim 27, wherein the predetermined laser beam output characteristic includes a maximum laser power output.

29. The method of claim 25, further comprising, after the altering, affixing the first optical element to the second optical element.

30. The method of claim 25, wherein the first and second contact surfaces are matched optical surfaces that remain in contact with each other throughout the altering.

31. A method for assembling a monolithic optical assembly, the monolithic optical assembly including at least a first optical element and a second optical element, the first and second optical elements being in surface contact with each other along contacting surfaces that are matched optical grade surfaces, the method comprising:
  displacing one of the first and second optical elements, relative to the other of the first and second optical elements, from a first orientation to a second orientation relative to the other of the first and second optical elements while maintaining the matched optical grade surfaces in contact,
  wherein a beam incident on the first optical element is reflected by the second optical element, and
  an alignment precision of the beam reflected by the second optical element with respect to one of the incident beam, a transmitted beam, or other reflected beams in the monolithic optical assembly, is improved with the first optical element in the second orientation over the first optical element in the first orientation.

32. The method of claim 31, wherein the alignment precision with the first optical element in the second orientation is independent of a change in direction of the incident beam.

33. The method of claim 31, wherein the first optical element has a variable thickness or a variable refractive index along a direction perpendicular to a central axis of the first optical element.

34. The method of claim 31, wherein the monolithic optical assembly is aligned with respect to an optical function thereof to within 10 arc sec tolerance with the first optical element in the second orientation, and the monolithic optical assembly is aligned with respect to an optical function thereof to a tolerance greater than 10 arc sec with the first optical element in the first orientation.

35. The method of claim 31, wherein the first and second optical elements include a second surface mirror and a transmission wedge plate.

* * * * *